(12) United States Patent
Simons

(10) Patent No.: US 7,669,486 B2
(45) Date of Patent: Mar. 2, 2010

(54) WEIGHING DEVICE

(76) Inventor: Gerald S. Simons, 6 Forest Laneway, Unit 2514, Toronto, Ontario (CA) M2N 5X9

( * ) Notice: Subject to any disclaimer, the term of this patent is extended or adjusted under 35 U.S.C. 154(b) by 0 days.

(21) Appl. No.: 12/022,419

(22) Filed: Jan. 30, 2008

(65) Prior Publication Data
US 2008/0178690 A1    Jul. 31, 2008

Related U.S. Application Data

(60) Provisional application No. 60/897,998, filed on Jan. 30, 2007, provisional application No. 60/993,532, filed on Sep. 13, 2007.

(51) Int. Cl.
*G01L 1/12* (2006.01)

(52) U.S. Cl. .................................. 73/862.636

(58) Field of Classification Search . 73/862.61–862.69; 177/136
See application file for complete search history.

(56) References Cited

U.S. PATENT DOCUMENTS

| 3,910,363 | A | * | 10/1975 | Airesman | 177/139 |
|---|---|---|---|---|---|
| 4,899,840 | A | | 2/1990 | Boubille | |
| 5,476,428 | A | * | 12/1995 | Potash et al. | 482/5 |
| 5,824,963 | A | * | 10/1998 | Bruns et al. | 177/136 |
| 6,422,800 | B1 | * | 7/2002 | Reichow et al. | 414/408 |
| 6,558,299 | B1 | * | 5/2003 | Slattery | 482/93 |
| 6,600,111 | B2 | * | 7/2003 | Simons | 177/139 |
| 6,730,861 | B1 | | 5/2004 | Simons | |
| 7,026,557 | B2 | * | 4/2006 | Rice et al. | 177/136 |
| 2003/0234122 | A1 | | 12/2003 | Kroll et al. | |
| 2007/0041820 | A1 | | 2/2007 | Simons | |

FOREIGN PATENT DOCUMENTS

| CA | 2136488 | 5/1995 |
|---|---|---|
| CA | 2 353 912 | 1/2003 |
| WO | PCT/CA2008/000187 | 5/2008 |

* cited by examiner

*Primary Examiner*—Max Noori
(74) *Attorney, Agent, or Firm*—Anthony Asquith Corp.

(57) ABSTRACT

The weight sensing device may include a base, a cover, a first load cell attached to the base and the cover, a second load cell attached to the base and in contact with the cover but not attached, and an analyzing circuit which is connected by electrical wires to the load cells. The base may be a fork, for example, a lift truck fork. When a load is positioned on the load bearing surface of the cover, the load cells flex and cause an electrical signal to be transmitted over the wires to the analyzing circuit.

22 Claims, 8 Drawing Sheets

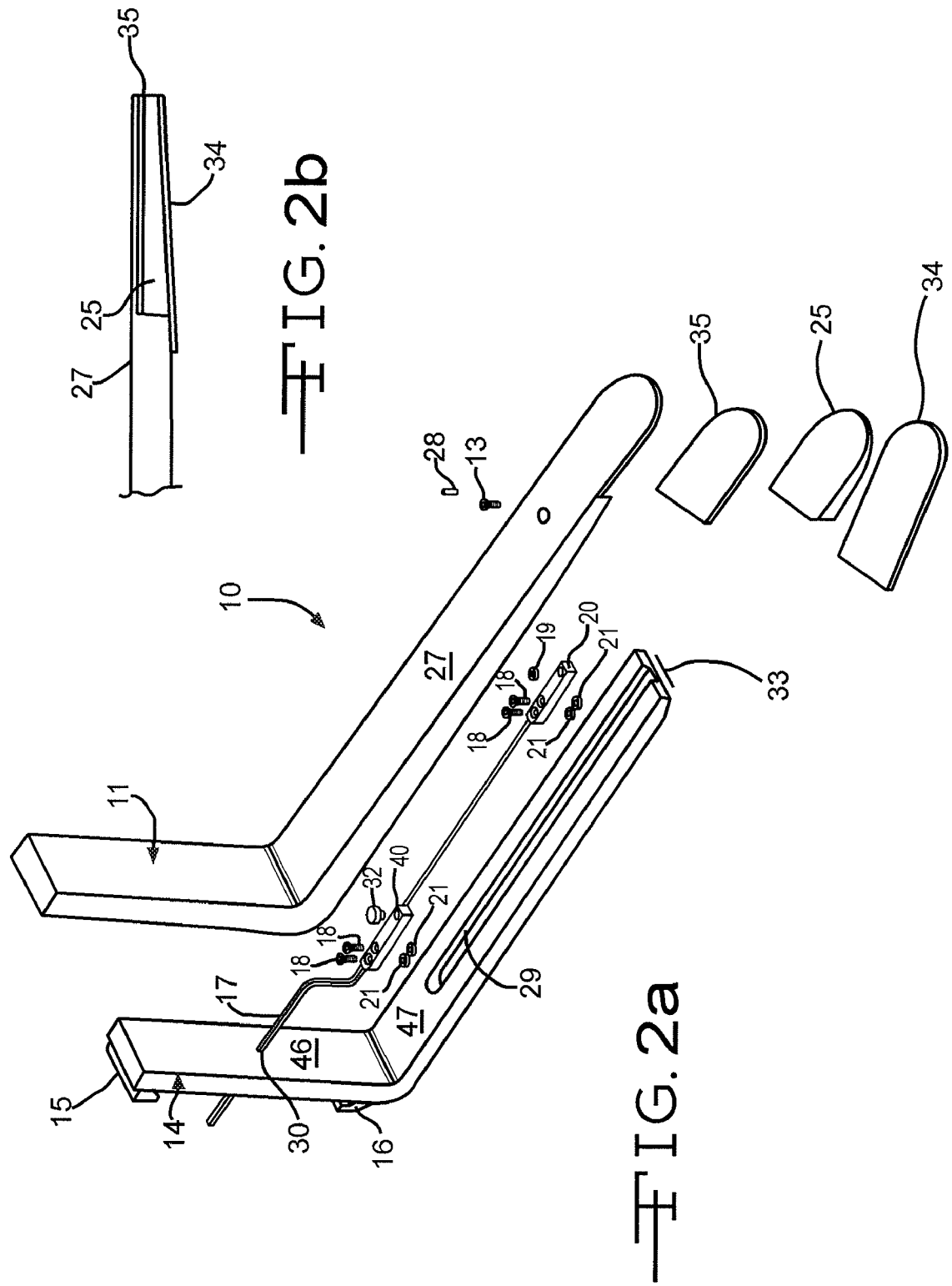

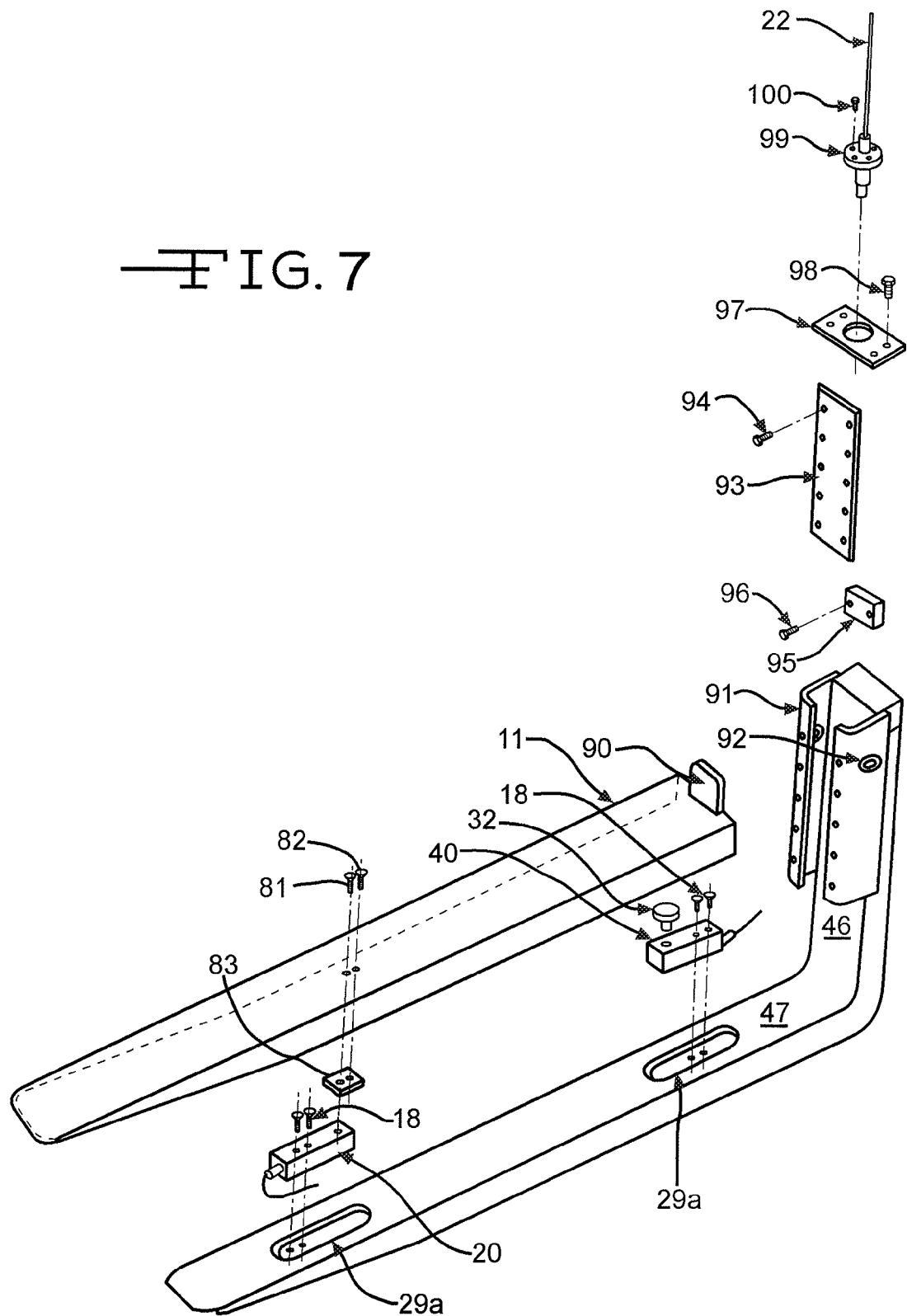

WEIGHING DEVICE

CROSS-REFERENCE TO RELATED APPLICATION

This application claims the benefit of priority to U.S. provisional patent application Ser. No. 60/897,998, filed on Jan. 30, 2007, now pending and U.S. provisional patent application Ser. No. 60/993,532, filed on Sep. 13, 2007, now pending—both of which applications are hereby incorporated by reference.

FIELD OF THE INVENTION

The present invention relates in general to electrical/electronic weighing systems.

BACKGROUND OF THE INVENTION

It is known that lift trucks, hand trucks, and the like may perform lifting and transporting functions. Weighing functions may also be carried out with this type of equipment when fitted with a weight measuring system. However, specific problems can and do arise with prior art systems with regard to carrying out lifting and weighing operations, manufacturing, installation and servicing. For example, some prior art systems require structural modifications or additional attachments to the lift truck, adding cost and resulting in more difficult and time consuming installation. See U.S. Pat. Nos. 4,421,186 and 6,002,090.

Some prior art systems are time consuming and cumbersome to operate because the device must be set to a first configuration in order to perform weighing operations and a second configuration in order to perform transport operations. This requires the operator to perform additional steps before weighing functions can be performed. See U.S. Pat. No. 5,739,478.

Some prior art systems employ technically and physically elaborate approaches to address excessive vertical forces, lateral forces and binding in the weighing system. Excessive forces and binding can cause inaccurate weight readings and damage to the load cells. See U.S. Pat. Nos. 4,421,186 and 6,002,090. See also the inventor's previous patent, U.S. Pat. No. 6,730,861 ("the '861 patent") wherein there is claimed a lift truck fork apparatus which includes two load cells, both of which are attached to the cover of the apparatus. A fixed linkage between the cover and the load cells ought to create a more direct, and thus accurate, measurement system. However, in practice, irregularities in the geometry of typical forks create an imperfect base upon which a load cell is mounted. When a load is applied, the imperfect fork may twist slightly, thereby resulting in the creation of a shear force. This results in the load cells inaccurately measuring the weight of the load. A further problem with the design described in the '861 patent is that the shear forces may exceed the limit of the bolts which attach the load cell to the cover, resulting in failure of these bolts.

Some prior art systems use only a portion of the lifting surface for weighing, which limits load placement options, and employ partial shrouds or covers that do not extend over the entire fork and subassembly surface. Such systems are prone to false weight readings due to contamination of the weighing subsystem by foreign substances such as dirt and water. See U.S. Pat. No. 4,420,053.

Some prior art systems employ mechanically elaborate designs to address weight measurement accuracy problems resulting from eccentric loads. These are likely to be prone to mechanical malfunction and high manufacturing cost. See U.S. Pat. No. 4,368,876.

Some prior art system designs are not based on standard lift truck fork configurations and are much thicker or much higher in cross section, or have component details that protrude far above the general height of the fork lifting surface, thereby making it more difficult or impossible to slide the forks under a standard pallet. See U.S. Pat. Nos. 4,899,840 and 5,861,580. Further, prior art systems not based on standard lift truck forks tend to require more custom manufactured components and complexity, usually resulting in higher manufacturing costs and requiring more highly skilled or knowledgeable service personnel.

Some prior art systems require additional weigh system attachment components, such as a secondary carriage, that can create a potentially unbalanced and unsafe condition because the position of the forks is moved forward relative to the lift truck, thereby resulting in incorrect load centers specified by the lift truck manufacturer. See U.S. Pat. Nos. 4,421,186 and 6,002,090.

Accordingly, there is a need for a weighing device which is fast, easy, and safe to use; simple to build and install; and is resistant to inaccuracy due to lateral forces or contamination by foreign substances.

BRIEF SUMMARY OF THE INVENTION

The present invention may be embodied as a device having a base, a cover, a first load cell, a second load cell, and an analyzing circuit. The first load cell may be attached to the base and the cover, whereas the second load cell may be attached to the base and be in contact with the cover but not attached. The analyzing circuit may be electronically connected by wires to the load cells. When a load is positioned on a load bearing surface of the cover, the load cells flex and cause electrical signals to be transmitted via the wires to the analyzing circuit. The base may be a fork, for example, a lift truck fork.

This arrangement with one load cell attached to the cover and the other load cell supporting the cover but not attached has shown unexpected improvements in accuracy when compared to the '861 patent. It has proved better to have one load cell attached to the cover with the second load cell allowed to float. This ability to float relative to the cover, allows both the load cells to more accurately measure the weight of the load.

The cover may be prevented from lifting off of the base by using a spacing plate and a reinforcing plate arrangement. The spacing plate may be attached to the cover and positions the reinforcing plate such that a lifting force applied to the cover will cause the reinforcing plate to engage with the base and prevent the cover from separating from the base.

The cover may be prevented from lifting off of the base by a tongue extending from the cover and engaging with an angle bracket on a mounting portion of the fork. More than one angle bracket may be used. A plate may interconnect the angle brackets in order to form an enclosed configuration in which to capture the tongue. The plate may be fastened to the brackets by fasteners, such as screws or rivets. The angle bracket may include wire access holes in order to route signal wires or control wires, or both therethrough. A connector and/or a terminal may be used for easier attachment of the assembly to a lift truck by allowing the signal wires to be easily disconnected from the lift truck.

The load cells may be recessed into the base by the inclusion of a channel into which the load cells are mounted. For example, the second load cell may be attached at one end to the channel. At another end of the second load cell, a stud contacts the underside of the cover. In this way, measurement accuracy may be improved by accommodating twisting forces applied to the assembly.

The load cells may be electronically matched to give more accurate weight data. Electronically matched load cells have similar electrical responses to applied loads and temperature. By using matched load cells, the signals from the load cells can be directly compared and analyzed without conversion of the signals from the individual load cells.

A further advantage of the present invention is the ability to use a standard, commercially available lift truck fork as the base of the device. Such a standard fork may require only a minor amount of modification in order for it to be used in a device according to the invention. For example, the standard fork may be modified by machining operations such as milling and/or drilling.

DESCRIPTION OF THE DRAWINGS

For a fuller understanding of the nature and objects of the invention, reference should be made to the following detailed description taken in conjunction with the accompanying drawings, in which:

FIG. 2a is an exploded perspective view of a weight sensing lift truck fork according to the present invention.

FIG. 2b is a side view of a portion of the weight sensing lift truck fork depicted in FIG. 2a, showing the toe end of the cover.

FIG. 4 is a sectional view of the weight sensing lift truck fork taken along section line 3-3 of FIG. 3a.

FIG. 7 is an exploded perspective view of another embodiment of the weight sensing lift truck fork according to the present invention.

DETAILED DESCRIPTION OF THE INVENTION

Figure 1:
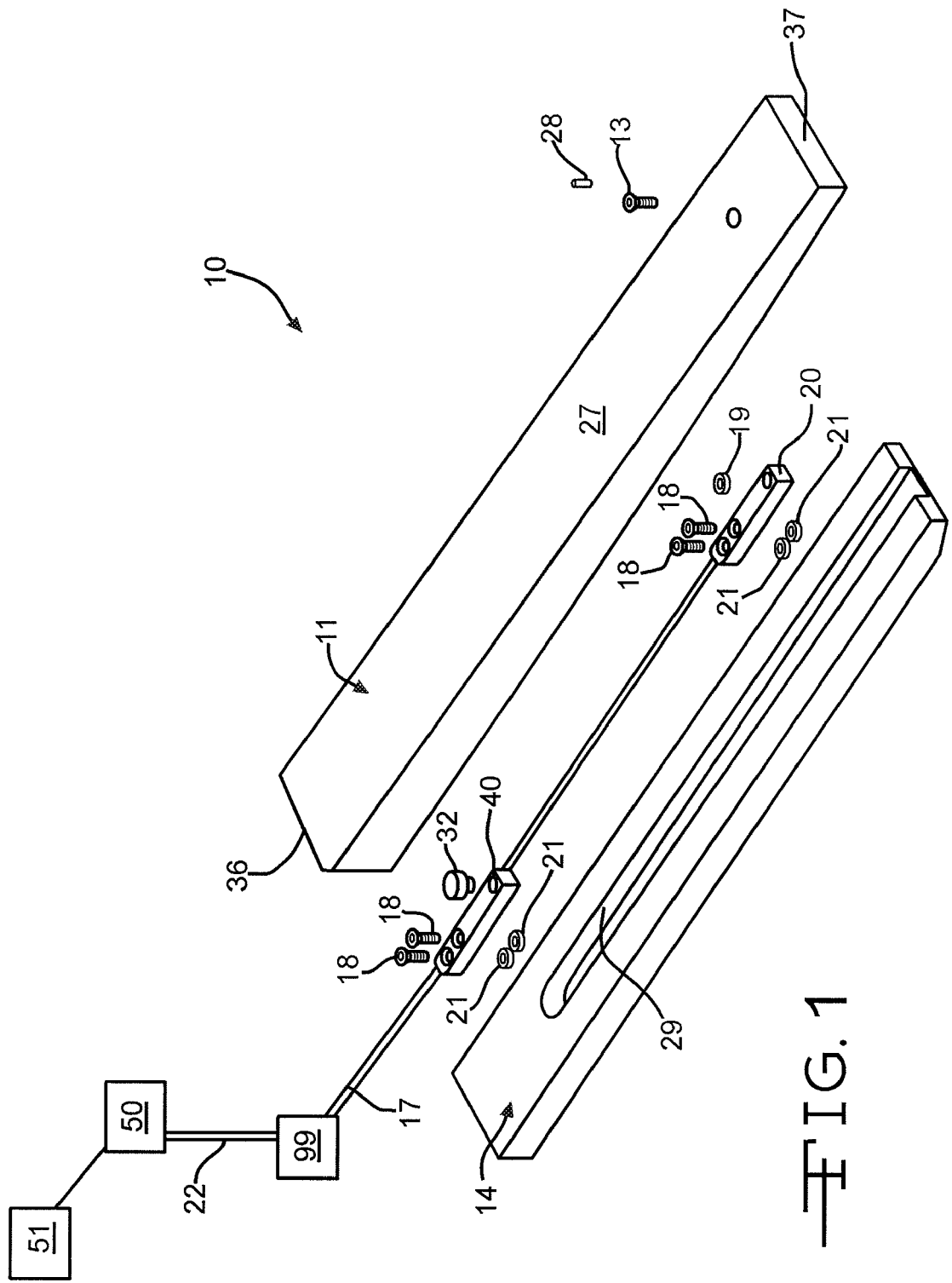
FIG. 1 is an exploded perspective view of a weight sensing device according to the present invention.
Figure 3A:
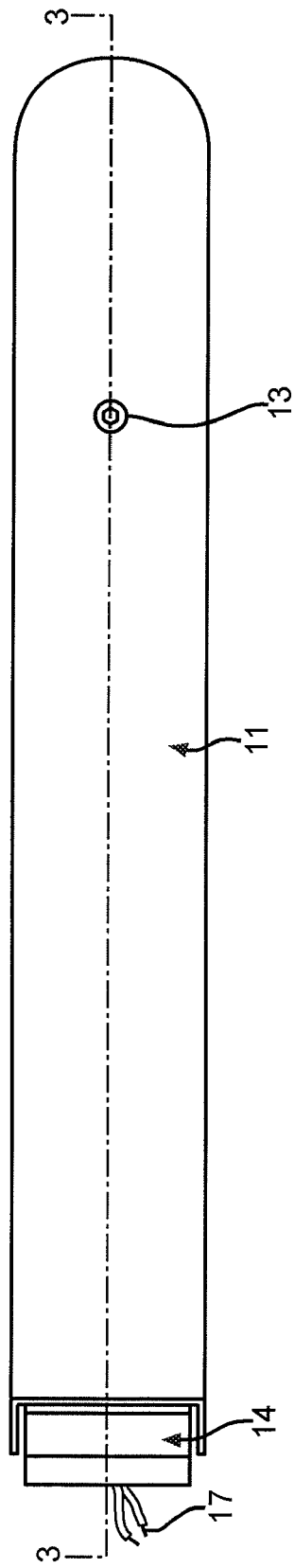
FIG. 3a is a top view of a weight sensing lift truck fork according to the invention, with cover attached.
Figure 3B:
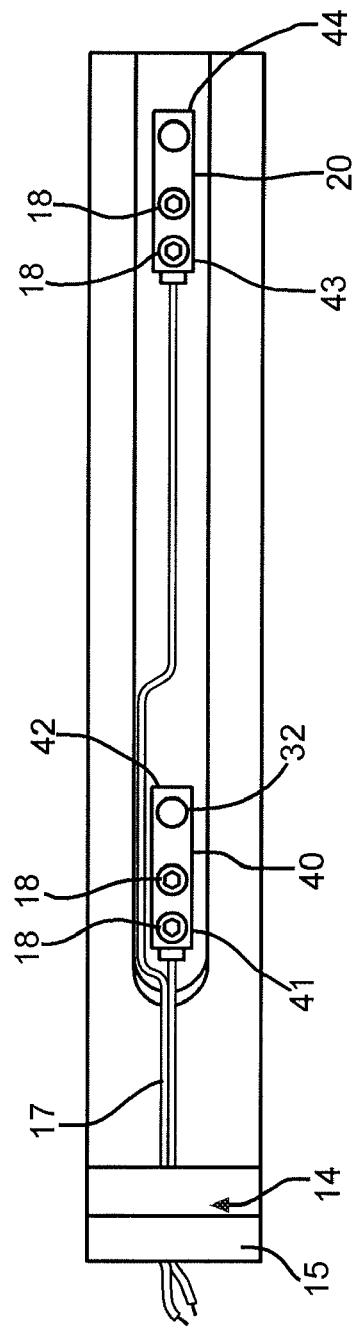
FIG. 3b is a top view of the weight sensing lift truck fork in FIG. 3a, but without the cover.

FIG. 1 depicts a device 10 according to the invention which may include the following components a base 14; a cover 11 having a load bearing surface 27, a heel end 36, and a toe end 37; a first load cell 20; a second load cell 40; and an analyzing circuit 50. With reference to FIG. 3b, the first load cell 20 may have a base end 43 and a cover end 44, wherein the base end 43 is attached to the base 14 and the cover end 44 is attached to the cover 11. The second load cell 40 may have a base end 41 and a cover end 42, wherein the base end 41 is attached to the base 14 and the cover end 42 supports, but is not attached to, the cover 11. The load cells 20, 40 are able to flex in response to a load positioned on the load bearing surface 27 of the cover 11. The analyzing circuit 50 may be connected by electrical wires 17 to the first and second load cells.

The load cells 20, 40 may be of any type commonly known in the art, such as a strain gauge, or a piezoelectric material. The analyzing circuit 50 may perform an adding or other function to correlate measurements to a weight. The analyzing circuit 50 may be selected according to the type of strain gauges used. For example, if resistance-type strain gauges are used as load cells, a voltmeter or ammeter measuring the output of a Wheatstone bridge may be used. When a load is positioned on the load bearing surface 27 of the cover 11, the load cells 20, 40 flex and cause an electrical signal to be transmitted over the wires 17 to the analyzing circuit 50. The analyzing circuit may be connected to a display 51, which may display a weight reading so that an operator can know the weight of an object placed on the cover 11.

In FIG. 2a there is shown a base 14 in the form of a fork which is suitable for attachment to, for example, a lift truck. The fork may be formed with a mounting portion 46 for attachment to the truck and a lifting portion 47 upon which a load may be placed. The device 10 may be mounted to a commercially available lift truck by way of an upper bracket 15 and a lower bracket 16, which are configured and arranged on the mounting portion 46 of the fork to interface with a standard fork mounting carriage, as is commonly known in the art. This can be done without modification to the lift truck or the use of additional components, such as a secondary carriage, thus facilitating ease of installation and servicing. Proper positioning of the load and balance of the lift truck is maintained, thus improving safety during lifting, weighing, and transport functions. In the lift truck application, the device 10 may typically be used in pairs, one for each fork of the lift truck.

Figure 4:
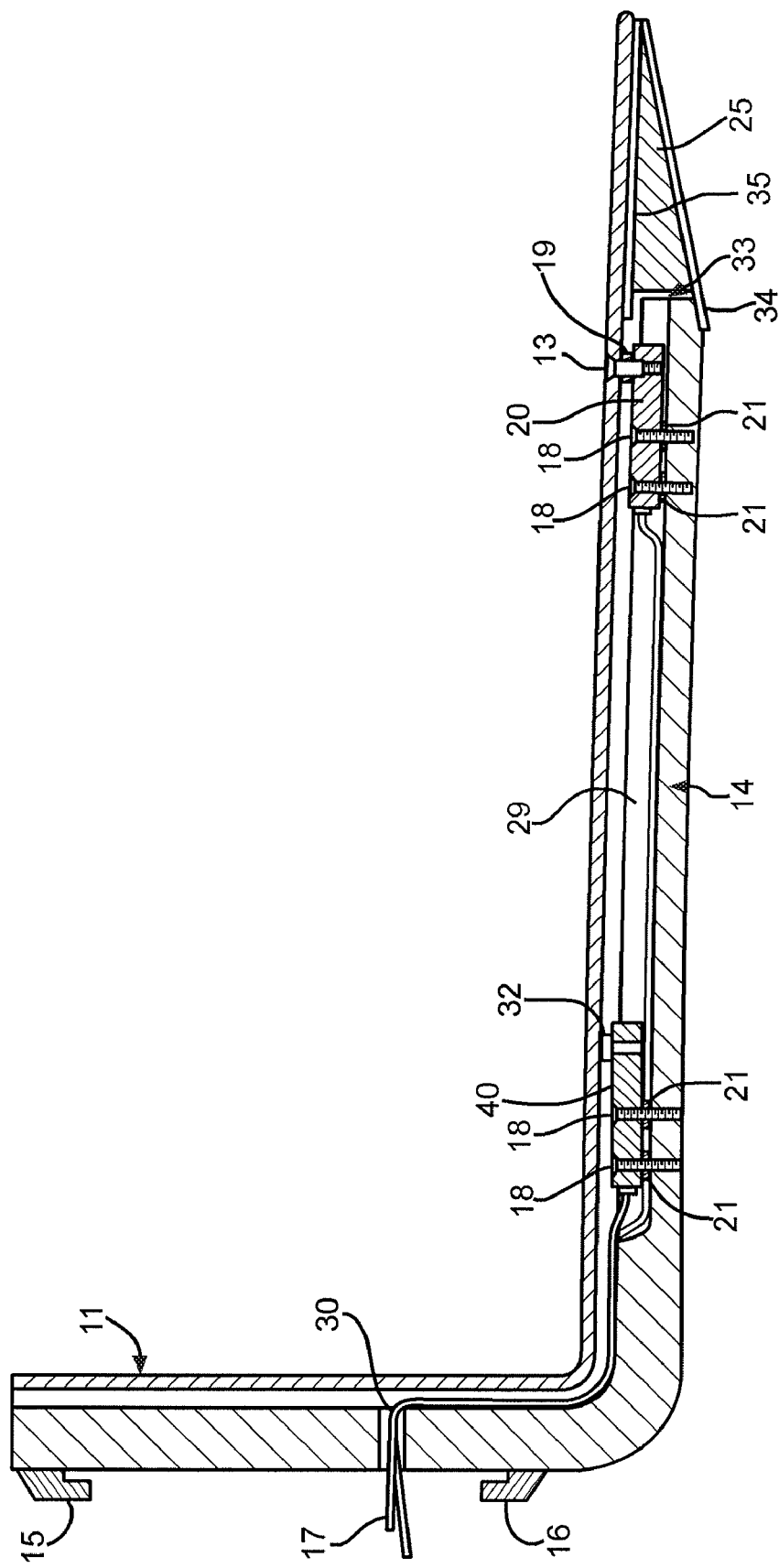

In an embodiment of the invention, shown in FIGS. 2a, 2b, and 4, the cover 11 may be prevented from lifting off of the base 14 by using a spacing plate 35 and a reinforcing plate 34 which may be attached to the underside of the cover 11. The spacing plate 35 and reinforcing plate 34 may be configured and arranged to capture the toe end 33 of the base 14. In this way, a force applied to the cover 11, which would tend to lift the cover 11 from the base 14, will cause the reinforcing plate 34 to engage with the base 14 and prevent the cover 11 from separating from the base 14. The spacing plate 35 may be combined with a removed tip 25 of a fork to create the proper arrangement.

In another embodiment of the invention, shown in FIG. 7, the cover 11 may be prevented from lifting off of the base 14 by a tongue 90, which extends from the load bearing surface 27 of cover 11. The tongue 90 may engage one or more angle brackets 91 attached to the mounting portion 46 of the fork base 14. If more than one angle bracket 91 is used, a plate 93 may be affixed to the brackets 91. In the configuration shown in FIG. 7, two angle brackets 91, the plate 93, and the mounting portion 46 of the fork form a rectangular configuration that captures the tongue 90. The plate 93 may be fastened to the brackets 91 by fasteners 94. The angle bracket 91 may include wire access holes 92.

The device 10 may include a connector 99 affixed to the mounting portion 46 of the fork base 14. The connector 99 may be fitted to a mounting plate 97, which may be connected by fasteners 98 and 100. The connector 99 may be connected to the wires 17 and may be suitable for removably connecting the lift truck signal cables 22 by using, for example, a coil cable. Use of the connector 99 increases the ease with which the device 10 may be disconnected from the lift truck. The wires 17 and signal cables 22 may also be connected to a terminal 95 with fasteners 96 in addition to, or instead of, the connector 99.

The load cells 20, 40 may be recessed into the base 14 to reduce the overall side profile of the device 10 by the inclusion of one or more channels 29 into which the load cells 20, 40 may be mounted. Such channels 29 may, for example, be machined into the base 14, formed by a casting of the base 14, or produced by other means commonly known in the art. FIG. 1 shows an embodiment in which the channel 29 extends substantially the length of the base 14, but the channel 29 need not be that long. The base end 43, 41 of each load cell 20, 40 may be affixed to the recessed surface of the channel 29. FIG. 7 shows an embodiment in which two channels 29a are used, one for each of the two load cells 20, 40.

Figure 5A:
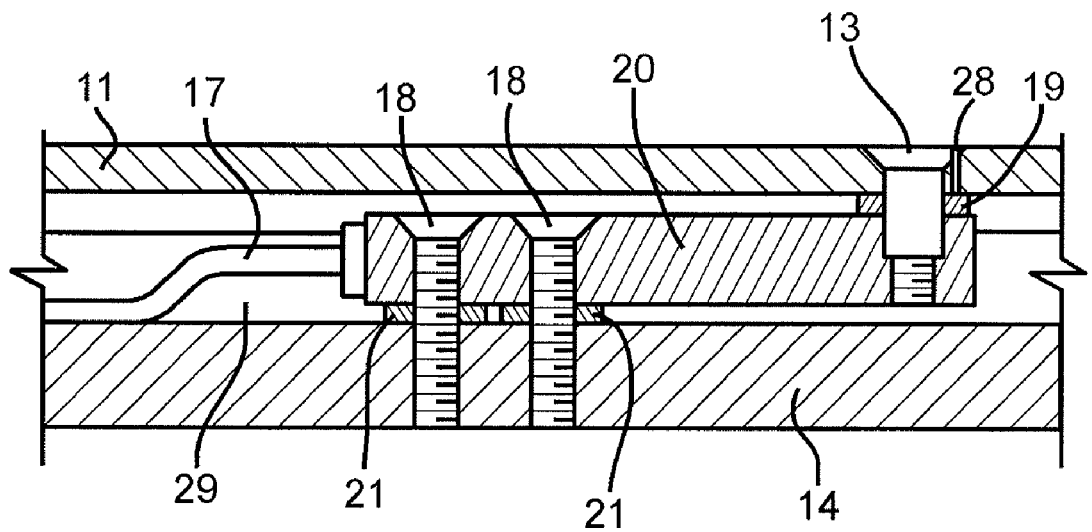
FIG. 5a is an enlarged view of a portion of the weight sensing lift truck fork according to the invention, showing the toe load cell subassembly.
Figure 5B:
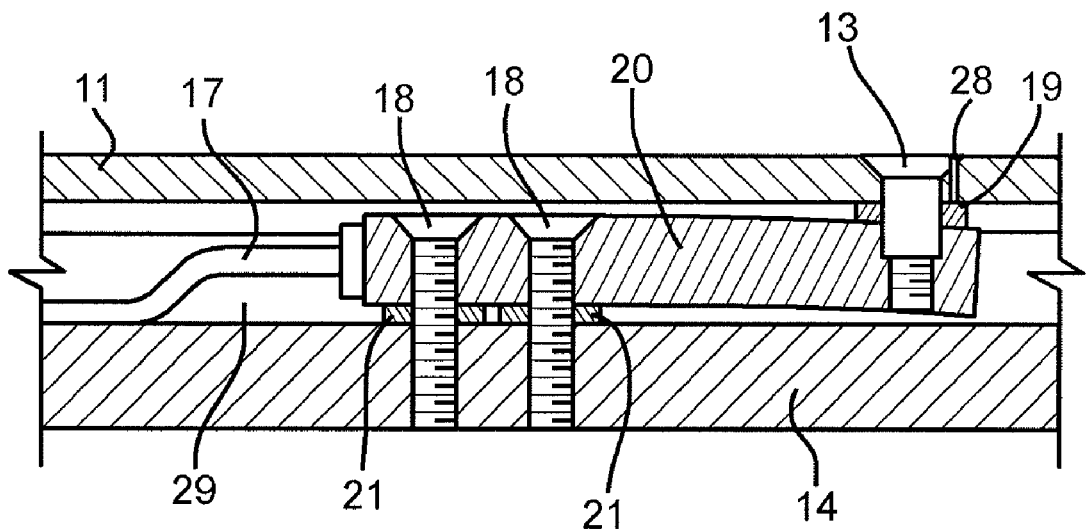
FIG. 5b is similar to FIG. 5a but FIG. 5b shows how the components might appear when a load is applied to the cover.

FIGS. 5a and 5b depict the first load cell 20 in a no-load condition and a load condition, respectively. The first load cell 20 is shown, in an exemplary configuration, attached at the base end 43 of the load cell 20 to the recessed surface of the channel 29 by the use of two fasteners 18. Also shown are two spacers 21, which may allow the load 20 cell to cantilever and, thus, to flex in response to a load placed upon the cover 11. The first load cell 20 is shown attached at the cover end 44 of the load cell to the cover 11 by the use of a fastener 13. Also shown is a cover spacer 19, which limits contact between the load cell 20 and the cover 11 to the cover end 44 of the load cell 20. The spacers 21 may be selected with a thickness which allows the cover end 44 of the load cell 20 to contact the recessed surface of the channel 29 at the point at which, or just before, the design limits of the load cell 20 have been reached or exceeded. Alternatively, the spacers 21 may be selected with a thickness which allows the cover end 44 of the load cell to contact the recessed surface of the channel 29 at the point at which, or just before, the load cell is damaged by excessive weight placed on the cover 11, which may otherwise over-flex the load cell 20.

Twisting forces and binding between the components of the device 10 could affect the accuracy of load weight signals. This binding may be prevented by the spacing between the components and by not fully tightening the fastener 13. Further loosening of the fastener 13 may be prevented by tension pin 28. The tension pin 28 may be driven into a hole drilled into the edge of the head of the countersunk fastener 13 and then through an aligned hole in cover 11 to create a locking configuration as shown in FIGS. 5a and 5b.

Figure 8:
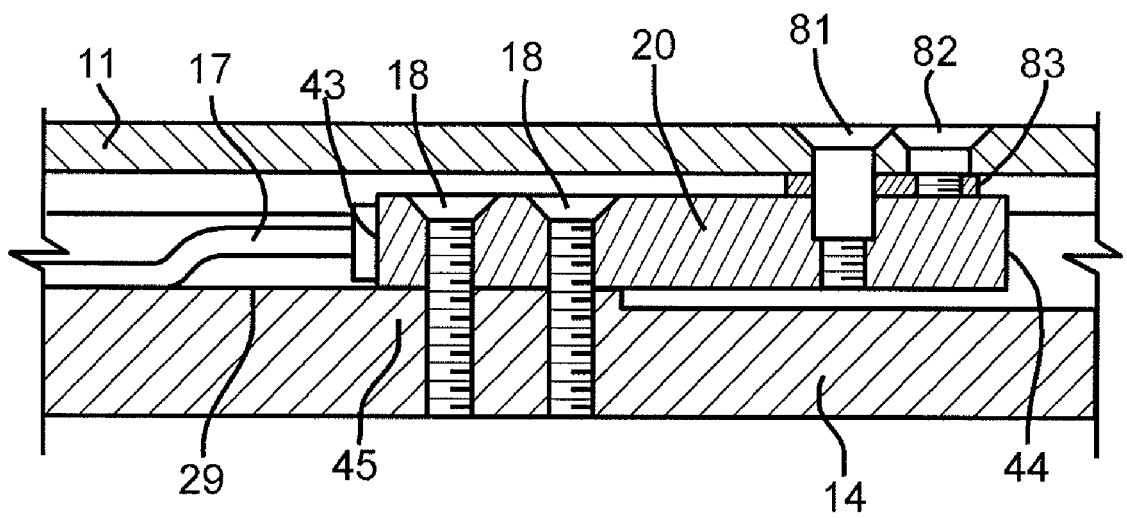
FIG. 8 is an enlarged view of a portion of an alternative weight sensing lift truck fork according to the invention, toe load cell subassembly.

FIG. 8 depicts an alternative configuration of the cover attachment portion of the first load cell 20. At the cover end 44 of the first load cell 20 are two fasteners, 81 and 82. Fastener 82 attaches cover spacer 83 to cover 11. Fastener 81 attaches cover 11 to the cover end 44 of the first load cell 20, traversing through the spacer 83. Also shown is the use of a step 45 to allow the load cell 20 to cantilever as an alternative to the previously described spacers 21. The height of the step 45 may be designed to allow the cover end 44 of the load cell 20 to contact the recessed surface of the channel 29 at the point at which, or just before, the design limits of the load cell have been reached or exceeded.

Figure 6A:
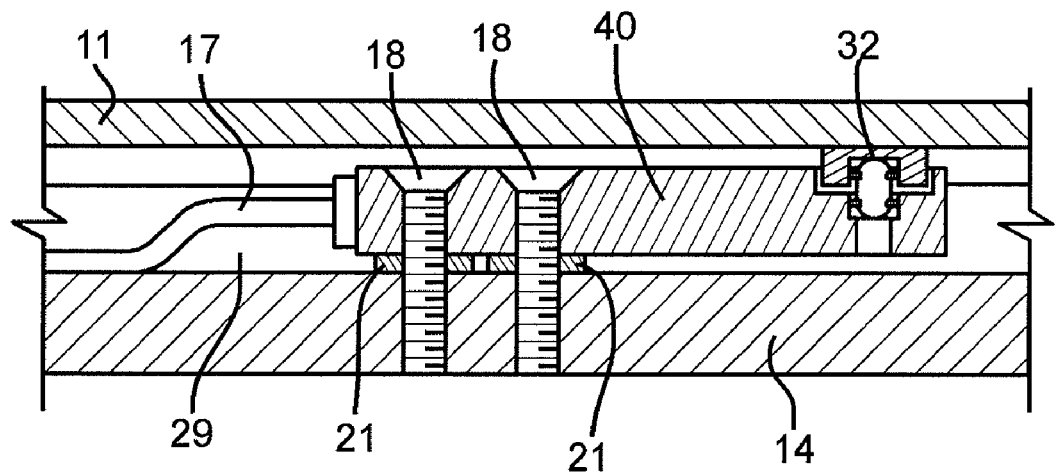
FIG. 6a is an enlarged view of a portion of the weight sensing lift truck fork according to the invention, showing the heel load cell subassembly.
Figure 6B:
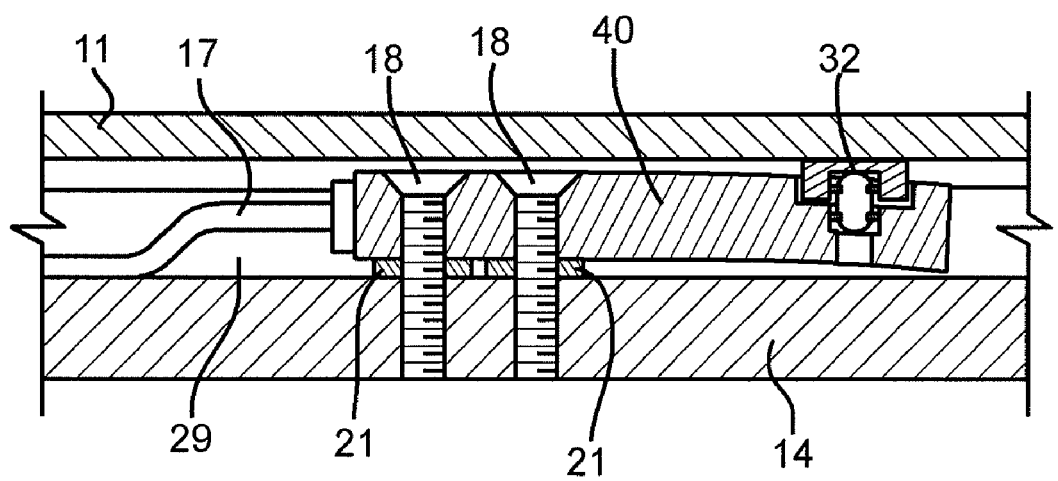
FIG. 6b is similar to FIG. 6a, but FIG. 6b shows how the components might appear when a load is applied to the cover.

FIGS. 6a and 6b depict a second load cell 40 according to the invention in a no-load condition and a load condition, respectively. The second load cell 40 is shown attached at the base end 41 of the load cell 40 to the recessed surface of the channel 29 by the use of two fasteners 18 and two spacers 21 in the same way the first load cell is attached to the channel. In the present device 10, the second load cell 40 is not attached to the cover 11. Instead, the second load cell 40 may be configured with a stud 32. The stud 32 may be in contact with the cover 11 but not affixed to the cover 11. In this fashion, the cover 11 is allowed to slide on the stud 32, which allows the cover 11 to pivot about the attachment point of the first load cell 20, which will reduce the likelihood of having shear or lateral forces supporting the load. Thus, the resulting measurement will more accurately reflect the actual weight of the load.

It should be recognized that the roles of the first load cell 20 and the second load cell 40 may be reversed, whereby the second load cell 40 is attached to the cover 11 by one of the configurations heretofore described, and the first load cell 20 is not attached to the cover 11 and allowed to float in the manner heretofore described.

The load bearing cover 11 of the device 10 may be given a low profile. Further, a substantially uniform load bearing surface 27 may be provided. Preferably, all fasteners which attach the cover 11 to a load cell 20 are countersunk, so that a load may easily slide onto the cover 11. See FIG. 4. These features enhance easy and unobstructed access of the load bearing surface 27 under a typical standard pallet or load, which usually have limited access space.

The load cells 20, 40 may be electronically matched to address variations in weight readings because of irregularly configured loads, thereby accommodating a variety of load positions on the cover surface 27 while maintaining the ability to measure the weight of loads accurately. Electronically matched load cells 20, 40 have similar electrical responses to applied loads and temperature. By using matched load cells 20, 40, the signals from the load cells 20, 40 can be directly compared and analyzed without conversion of the signals from the individual load cells.

Where the terms of the present application are unclear, vague, or undefined, the '861 patent is hereby incorporated by reference to the extent it remedies the insufficiency.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A weight sensing device, comprising:

[1] a base;

[2] a cover having a load bearing surface, a heel end, and a toe end;

[3] a first load cell having a base end and a cover end, wherein

[4] the base end of the first load cell is attached to the base,

[5] the cover end of the first load cell is attached to the cover, and

[6] the first load cell is able to flex in response to a load positioned on the load bearing surface of the cover;

[7] a second load cell having a base end and a cover end, wherein

[8] the base end of the second load cell is attached to the base,

[9] the cover end of the second load cell supports, but is not attached to, the cover, and

[10] the second load cell is able to flex in response to a load positioned on the load bearing surface of the cover; and

[11] an analyzing circuit which is electronically connected to the first and second load cells, wherein

[12] the first and second load cells each send a weight signal to the analyzing circuit in response to flexing of the load cells caused by a load positioned on the load bearing surface of the cover.

2. The weight sensing device of claim 1, wherein the base includes a channel having a recessed surface, and the base end of the load cell is affixed to the recessed surface.

3. The weight sensing device of claim 2, wherein the channel is formed to include a step, and the load cell is positioned to allow the cover end of the load cell to be cantilevered.

4. The weight sensing device of claim 2, further comprising a spacer having a thickness which positions the load cell relative to the channel allowing the cover end of the load cell to be cantilevered.

5. The weight sensing device of claim 4, wherein the thickness of the spacer ensures the cover end of the load cell will contact the recessed surface of the channel at, or before, the point at which the weight of a load applied to the load bearing surface of the cover exceeds a limit beyond which the load cell is no longer accurate.

6. The weight sensing device of claim 1, wherein the analyzing circuit is electrically connected to a display.

7. The weight sensing device of claim 1, wherein the base is a fork having a mounting portion and a lifting portion.

8. The weight sensing device of claim 7, further comprising:
 [2] a spacing plate affixed to the underside of the toe end of the cover; and
 [3] a reinforcement plate affixed to the underside of the spacing plate to prevent the cover from lifting off of the fork.

9. The weight sensing device of claim 8, wherein the fork has a removable tip, which is affixed between the spacing plate and the reinforcement plate.

10. The weight sensing device of claim 7, further comprising:
 [2] a tongue on the heel end of the load cover extending from the load bearing surface of the cover; and
 [3] an angle bracket affixed to the mounting portion of the fork to capture the tongue and limit movement of the cover.

11. The weight sensing device of claim 10, further comprising:
 [2] a second angle bracket affixed to the mounting portion of the fork; and
 [3] a plate affixed to the first and second angle brackets which, together with the first and second angle brackets and the mounting portion of the fork, forms a space in which the tongue is captured.

12. The weight sensing device of claim 11, further comprising a plurality of fasteners affixing the plate to the angle brackets.

13. The weight sensing device of claim 7, further comprising:
 [2] a connector affixed to the mounting portion of the fork,
 [3] the connector being suitable for connecting signal cables.

14. The weight sensing device of claim 7, further comprising a terminal affixed to the mounting portion of the fork, the terminal being suitable for connecting signal cables.

15. The weight sensing device of claim 7, further comprising a first fastener attaching the cover end of the first load cell to the cover.

16. The weight sensing device of claim 15, wherein the first fastener attaching the cover end of the load cell to the cover is only partially tightened allowing movement of the cover relative to the load cell to accommodate twisting forces.

17. The weight sensing device of claim 16, wherein:
 [2] a tension pin resides in aligned holes, one of the aligned holes being through an edge of a head of the fastener and another of the aligned holes being through the cover,
 [3] thereby preventing loosening of the partially tightened fastener that attaches the cover end of the load cell to the cover.

18. The weight sensing device of claim 15, further comprising a second fastener which affixes the load cover to the cover spacer but does not penetrate the load cell.

19. The weight sensing device of claim 1, wherein:
 [2] the device includes a stud, which is located between the cover end of the load cell and the cover;
 [3] the device is so arranged that the cover rests on the stud;
 [4] the device is so arranged that the weight of a load resting on the cover is transmitted downwards through the stud to the cover end of the load cell; and
 [5] the device is so arranged that the cover can move laterally relative to the cover end of the load cell, while the load is resting on the cover.

20. The weight sensing device of claim 1, wherein:
 [2] each load cell is in the form of a bar, which is so arranged in the device as to be stressed in bending when a weight is carried by the cover; and
 [3] the load cell sends to the analyzing circuit an electrical signal that is proportional to the bending deflection of the bar.

21. The weight sensing device of claim 1, in combination with a second weight sensing device that also falls within the scope of claim 1, and also in combination with a fork lift, wherein:
 [2] the fork lift includes left and right forks;
 [3] the two covers are fitted over the respective forks;
 [4] the forks of the fork lift comprise the respective bases of the devices.

22. A weight sensing device for use with a fork lift having left and right forks, comprising:
 [2] left and right cover members, which are structured to be capable of being placed over the forks;
 [3] left and right base members;
 [4] respective left and right first load-cells and second load-cells;
 [5] the four load-cells are so arranged in the device that, when a load is placed on the cover members, the load-cells flex in proportion to the load, and transmit electrical signals in proportion to the deflection;
 [6] in respect of each of the left and right covers and their respective first and second load-cells, the first and second load-cells have respective cover ends and base ends;
 [7] the load-cells include respective base members, by which the weight of the load, acting through the load-cells, is reacted against the forks;
 [8] the base end of the first load cell is bolted to the base member;
 [9] the cover end of the first load cell is bolted to the cover member;
 [10] one of the ends of the second load cell is bolted to one of those members;
 [11] the other of the ends of the second load cell is so mounted in the device that, the load having been placed on the cover members, relative lateral movement can take place between the other member and the second load cell.

* * * * *